United States Patent [19]
Zwayer et al.

[11] Patent Number: 5,645,239
[45] Date of Patent: Jul. 8, 1997

[54] FISHING REEL ANTI-REVERSE SYSTEM WITH DUAL-PURPOSE ACTUATOR SWITCH

[75] Inventors: Kent Zwayer; Nyle C. Erxleben, both of Tulsa, Okla.

[73] Assignee: Zebco Division of Brunswick Corporation, Tulsa, Okla.

[21] Appl. No.: 274,625

[22] Filed: Jul. 13, 1994

[51] Int. Cl.$^6$ ................................................. A01K 89/02
[52] U.S. Cl. .......................... 242/300; 242/247; 188/82.3
[58] Field of Search ................................. 242/300, 299, 242/247, 248; 188/82.3, 82.34

[56] References Cited

U.S. PATENT DOCUMENTS

| | | | |
|---|---|---|---|
| 2,964,257 | 12/1960 | Hull | 242/299 X |
| 3,670,855 | 6/1972 | Lemery | 188/82.3 |
| 4,087,058 | 5/1978 | Yamasaki et al. | 242/300 |
| 4,288,046 | 9/1981 | Morimoto et al. | 242/299 X |
| 4,391,418 | 7/1983 | Puryear | 242/300 |
| 4,779,819 | 10/1988 | Emura et al. | 242/300 X |
| 4,919,361 | 4/1990 | Kobayashi | 242/300 |

FOREIGN PATENT DOCUMENTS

| | | | |
|---|---|---|---|
| 2247970 | 5/1975 | France | 242/247 |
| 1977-06 | 6/1977 | Japan | 242/248 |

*Primary Examiner*—Daniel P. Stodola
*Assistant Examiner*—Emmanuel M. Marcelo
*Attorney, Agent, or Firm*—Wood, Phillips, VanSanten, Clark & Mortimer

[57] ABSTRACT

A fishing reel having a reel body, a shaft, structure for mounting the shaft to the reel body for rotation about a first axis, a line carrying spool, structure for mounting the line carrying spool to the reel body, structure for directing line onto the spool as an incident of the shaft rotating in one rotational direction, and anti-reverse structure placeable selectively in a) an engaged position for limiting rotation of the shaft in a direction opposite to the one direction, and b) a disengaged position in which the shaft can rotate in the direction opposite to the one direction. The anti-reverse structure includes a pawl, with structure mounting the pawl for movement relative to the reel body between first and second positions. The anti-reverse structure includes structure cooperating between the pawl and shaft for limiting rotation of the shaft in a direction opposite to the one direction with the pawl in the first position and for allowing the shaft to rotate in a direction opposite to the one direction with the pawl in the second position. The anti-reverse structure further includes an actuating switch movable between on and off positions, corresponding respectively to the engaged and disengaged positions for the anti-reverse structure. The actuating switch defines at least a part of the structure for mounting the pawl switch.

2 Claims, 3 Drawing Sheets

FISHING REEL ANTI-REVERSE SYSTEM WITH DUAL-PURPOSE ACTUATOR SWITCH

BACKGROUND OF THE INVENTION

1. Field of the Invention

This invention relates to fishing reels of the type that have a rotary element for directing line onto a spool and, more particularly, to a system for selectively preventing reverse rotation of the rotary element.

2. Background Art

Many manufacturers of fishing tackle offer down-sized fishing reels. Designers of these smaller fishing reels contend with the competing objectives of producing a high quality, durable product and one that is small and lightweight.

In a spincast-type reel, a spinner head is rotated to wrap line around a spool. It is common to incorporate an anti-reverse system to prevent reverse rotation of the spinner head. In this type of reel, the spool is stationary. A variable drag system allows the spool to rotate under a predetermined torque to avoid line breakage, as when a fish draws on the line with the reel in a retrieve state.

One difficult task for designers of this type of reel is to incorporate into a compact area the anti-reverse and drag systems as well as accessible actuators to facilitate operation of both systems by the user.

SUMMARY OF THE INVENTION

The present invention is specifically directed to an anti-reverse system which can be incorporated into a fishing reel both economically and in a compact configuration without compromising performance thereof.

In one form, a fishing reel is provided having a reel body, a shaft, structure for mounting the shaft to the reel body for rotation about a first axis, a line carrying spool, structure for mounting the line carrying spool to the reel body, structure for directing line onto the spool as an incident of the shaft rotating in one rotational direction, and anti-reverse structure placeable selectively in a) an engaged position for limiting rotation of the shaft in a direction opposite to the one direction, and b) a disengaged position in which the shaft can rotate in the direction opposite to the one direction. The anti-reverse structure includes a pawl, with structure mounting the pawl for movement relative to the reel body between first and second positions. The anti-reverse structure includes structure cooperating between the pawl and shaft for limiting rotation of the shaft in a direction opposite to the one direction with the pawl in the first position and for allowing the shaft to rotate in a direction opposite to the one direction with the pawl in the second position. The anti-reverse structure further includes an actuating switch movable between on and off positions, corresponding respectively to the engaged and disengaged positions for the anti-reverse structure. The actuating switch defines at least a part of the structure for mounting the pawl switch.

It is thus possible to have the actuating switch perform a dual function. This makes possible a reduction in the number of parts in the reel by obviating the need for a dedicated pawl mounting structure.

In one form, the actuating switch has a body that is mounted for pivoting movement relative to the reel body between the on and off positions.

The actuating switch has a head exposed externally of the reel to facilitate manipulation of the actuating switch between the on and off positions.

In one form, the body of the actuating switch projects through the pawl.

The reel body may define a receptacle for the pawl, with the actuating switch blocking the pawl in the reel body receptacle.

The shaft, line carrying spool, structure for mounting the line carrying spool, structure for directing line onto the spool and anti-reverse structure define part of an operating mechanism. The operating mechanism has a) a retrieve state and b) a casting state, with there further being an actuator for changing the operating mechanism from its retrieve state into its casting state. The actuator is movable relative to the body between first and second positions with there being means cooperating between the actuator and operating mechanism for changing the operating mechanism from its retrieve state into its casting state as an incident of the actuator moving from its first position into its second position. The actuating switch may have a slot therein to accept a portion of the actuator.

The actuator portion may extend into the slot fully through the actuating switch.

In one form, the body of the actuating switch is elongate, with the length of the actuating switch body extending substantially parallel to the first axis.

In one form, the fishing reel has a top and bottom and a front and rear and the head of the actuating switch is exposed at the rear of the fishing reel and may be located above the shaft.

The reel may also include a drag structure for producing a force on the spool that resists rotation thereof about the first axis. The drag structure includes an adjusting knob that may be located at least partially below the shaft.

In another form of the invention, an improvement is provided in a fishing reel of the type having a reel body and an operating mechanism including a line carrying spool, a rotatable shaft, structure for directing line onto the spool as an incident of the shaft being rotated in one rotational direction, and an anti-reverse structure selectively placeable in a) an engaged position for limiting rotation of the shaft in a direction opposite to the one direction and b) a disengaged position in which the shaft can rotate in the direction opposite to the one direction. The anti-reverse structure includes an actuating switch movable between on and off positions corresponding respectively to the engaged and disengaged positions for the anti-reverse structure.

According to the invention, the actuating switch has structure thereon for mounting another part of the anti-reverse structure in an operative position on the reel body.

The another part of the anti-reverse structure includes a first member mounted for movement relative to the body. The first member may be a pivotable pawl, as described above.

The anti-reverse structure may include teeth on the shaft to cooperate with the pawl to limit rotation of the shaft oppositely to the one direction with the anti-reverse structure in the engaged position.

With the actuating switch having an elongate body, structure can be provided cooperating between the actuating switch body and the reel body for releasably maintaining the actuating switch in each of the on and off positions therefor.

This structure may include a spring. In one form, the elongate body has first and second flats and the spring has a flat portion which facially and biasably abuts to one of the first and second flats in each of the on and off positions.

Cooperating structure can be provided between the pawl and actuating switch for limiting pivoting movement of the pawl in at least one direction of rotation.

In one form, the cooperating structure includes a tab on one of the pawl and actuating switch and a slot on the other of the pawl and actuating switch with the slot being bounded by an edge that is abuttable to the tab.

DETAILED DESCRIPTION OF THE DRAWINGS

Figure 1:
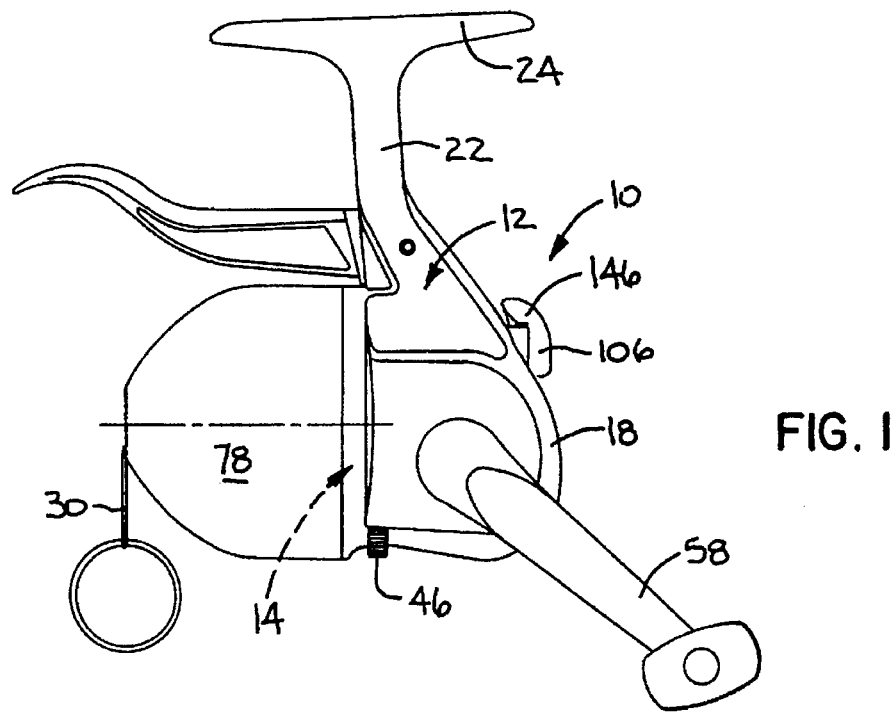
FIG. 1 is a side elevation view of a spincast-type fishing reel with an anti-reverse system, according to the present invention, incorporated therein.

In FIGS. 1–6, a spincast-type fishing reel is shown at 10 with the present invention incorporated therein. The fishing reel 10 is intended only to be exemplary of one type of reel construction into which the present invention can be incorporated. Consequently, the configuration of the fishing reel 10 should not be viewed as limiting.

The fishing reel 10 is sold by the assignee herein under the mark TRIGGERSPIN™. Briefly, the reel 10 has a reel body 12 which defines the foundation for the reel upon which the components of an operating mechanism at 14 are mounted. The reel body 12 includes a deck plate 16 to which a rear housing part 18 is attached. The housing part 18 defines a receptacle 20 for part of the operating mechanism 14 and blends into a mounting stem 22 which terminates at a mounting foot 24 which is attachable to a fishing rod (not shown) in conventional fashion.

The deck plate 16 has a forwardly projecting boss 26 which extends through and supports a spool 28 for retaining a supply of line 30.

The spool 28 is rotatable about a fore and aft, central axis 32 and is restrained from rotation therearound by a variable drag system at 34. Since the drag system 34 is peripheral to the present invention, it will be only briefly discussed herein below.

The drag system 34 includes a drag pressure applying plate 36 with rearwardly bent legs 38, 40, with the former received in a forwardly opening receptacle 42 in the deck plate 16. The leg 40 is keyed to a drag adjusting screw 44. A drag actuating knob 46 is threadably connected to the screw 44 and is mounted to the reel body 12 for rotation about a fore and aft axis, but is itself confined against fore and aft movement. Accordingly, rotation of the drag knob 46 effects fore and aft movement of the screw 44 and in turn the leg 40 on the drag pressure applying plate 36 situated therein. Forward movement of the drag screw 44 resiliently biases the drag pressure applying plate 36 against a friction washer 48 to thereby exert a force that resists rotation of the spool 28 about the axis 32.

The drag knob 46 projects through the rear housing part 18 and has an exposed, knurled outer surface 50 that can be conveniently operated by a user to effect setting of the desired drag force on the spool 28.

A spinner head assembly at 52 is provided to direct line 30 onto the spool 28. The spinner head assembly 52 includes a cup-shaped, rearwardly opening spinner head 54, which is connected to a centershaft 56. The centershaft 56 is journalled within the boss 26 for rotation about the axis 32. This rotation is imparted by a crank handle 58 which rotates a face gear 60 about a laterally extending axis 62. The face gear 60 is in mesh with a pinion gear 64 at the rear of the centershaft 56. The pinion gear 64 and centershaft 56 have a splined connection (not shown), which keys the pinion gear 64 against rotation relative to the centershaft 56 but allows relative fore and aft movement therebetween. A coil spring 66 surrounds the rear end 68 of the centershaft 56 and acts in compression between an enlarged head 70 thereon and the pinion gear 64 to urge the pinion gear 64 forwardly relative to the centershaft 56.

Figure 2:
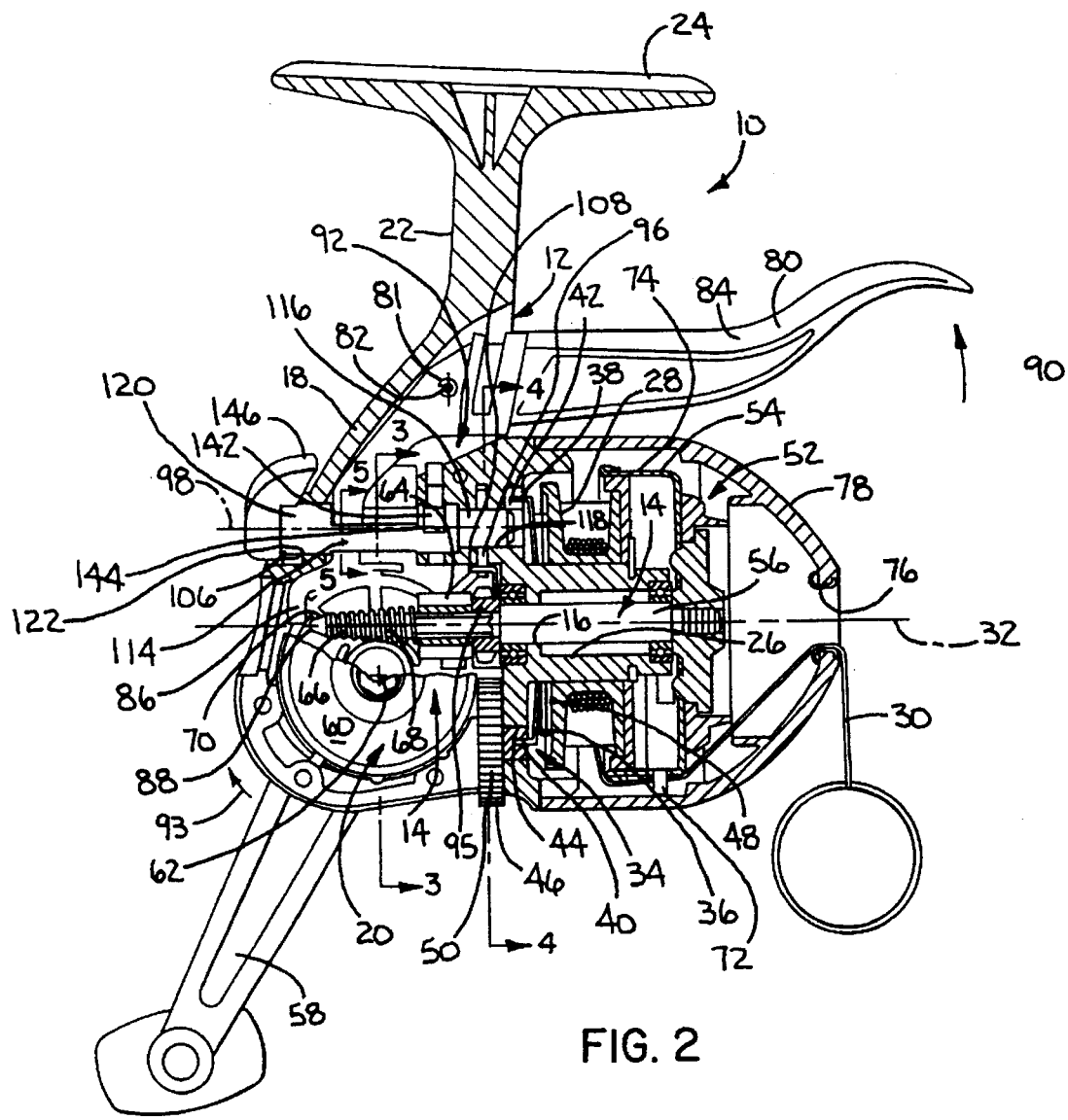
FIG. 2 is an enlarged view of the fishing reel in FIG. 1 taken in vertical section.

The operating mechanism 14 has two different states—a casting state and a retrieve state. The retrieve state is shown in FIG. 2, wherein a pickup pin 72 is extended radially beyond the outer surface 74 of the spinner head 54. The line 30 on the spool 28 extends over the spinner head 54 and is bent inwardly to be directed through a line opening 76 in a front cover 78 attached to the deck plate 16 to encase the forward portion of the operating mechanism 14. Through this arrangement, the line 30 is caused to be kept in contact with the outer surface 74 of the spinner head 54 to thereby be consistently picked up by the pickup pin 72 as the spinner head 54 is rotated through the crank handle 58. The rotating spinner head 54 wraps line 30 onto the spool 28.

Through a well known mechanism, as shown in U.S. Pat. No. 5,199,665, to Tipton, which is incorporated herein by reference, forward movement of the centershaft 56 retracts the pickup pin 72 and thereby places the operating mechanism 14 in a casting state. The line 30 in the casting state, can be freely paid off of the spool 28 without interference from the pickup pin 72. The previously mentioned mechanism is operable to reassume the retrieve state upon operation of the crank handle 58.

The operating mechanism 14 is changed from its retrieve state into its casting state through a pivotable actuator/trigger 80. The trigger 80 is mounted to the stem 22 by a pin 81 for pivoting movement about a laterally extending axis 82. The trigger 80 has an overall L-shaped configuration with an elongate actuating arm 84 extending forwardly from the stem 22 and a depending leg 86 which aligns with the rear, free end 88 of the center shaft 56. The arm 84 on the trigger 80 is located and configured to be grasped conveniently by a plurality of fingers on the hand of a user that is conventionally gripping the rod and reel at the mounting foot 24. Pivoting of the trigger 80 in a counterclockwise direction through upward pressure on the arm 84, as indicated by the arrow 90 in FIG. 2, causes forward movement of the trigger leg 86, shifting the centershaft 56 to thereby change the state of the operating mechanism 14.

The present invention is principally concerned with an anti-reverse mechanism at 92 which, when engaged, limits rotation of the centershaft 56 and spinner head 54 in a direction opposite to the winding direction. Rotation of the crank handle 58 in a winding direction rotates the face gear 60 clockwise, as indicated by the arrow 93 in FIG. 2, which in turn imparts rotation of the spinner head 54 that is counterclockwise, as viewed from the from of the reel and clockwise, as indicated by the arrow 94, when viewed from the rear of the reel as in FIGS. 3 and 4.

The anti-reverse mechanism 92 includes a toothed, ratchet wheel 95 that is mounted to the shaft 56 for rotation therewith between the pinion gear 64 and deck plate 16. The anti-reverse mechanism 92 also includes a pawl 96 that is pivotable about a fore and aft axis 98 between a first position, shown in solid lines in FIG. 4, wherein the shaft 56 can rotate oppositely to the winding direction, and a second position, shown in phantom lines in FIG. 4, wherein a nose 100 at the free end of the pawl 96 resides between adjacent teeth 102 on the toothed wheel 95. In this position, the nose 100 abuts to one of the tooth edges 104 to thereby prevent rotation of the shaft 56 oppositely to the winding direction.

Movement of the pawl 96 is controlled by an actuating switch 106 and an actuating wire 108. The actuating wire 108 is bent to define a triangular body 109 which surrounds the shaft 56 and is resiliently captively maintained between the ratchet wheel 95 and the deck plate 16, with the magnitude of this force being determined by the compressive force of the spring 66. With this arrangement, the wire 108 will follow rotational movement of the shaft 56 in both directions, but will slip upon encountering a predetermined resistance. This resistant force is developed in operation by the pawl 96.

More particularly, the pawl 96 has a U-shaped seat 110 which accepts a rearwardly projecting leg 112 on the wire 108. The captive force on the wire 108 is sufficient to cause the pawl 96 to follow movement of the leg 112 in the absence of resistance on the pawl 96. According to the invention, the actuating switch 106 is responsible for producing this resistant force and additionally serves to support the pawl 96 for movement between its first and second positions, previously described.

As to this latter function, the actuating switch 106 has an elongate body 114 with a reduced diameter, forward portion 116 rotatably supported within a bore 118 in the deck plate 16 and its rear portion 120 guided for rotation within an opening 122 in the rear housing part 18. This arrangement accounts for guided pivoting movement of the actuating switch 106 about the fore and aft axis 98, that is parallel to the central axis 32.

The deck plate 16 defines a receptacle 126 for the pawl 96. With the pawl 96 in the receptacle 126, the forward portion 116 of the body 114 projects fully through a bore 128 in the pawl 96 to thereby block the pawl 96 in an operative position in the receptacle 126. The forward portion 116 of the body 114 is cylindrical and matches the diameter of the bore 128 to allow the pawl 96 to freely pivot therearound.

The pawl 96 has a tab 130 that projects radially into the bore 128. The tab 130 moves in a circumferential slot 132 and is abuttable to spaced edges 134, 136 at the ends of the slot 132 to limit relative movement between the actuating switch 106 and pawl 96.

Figure 4:
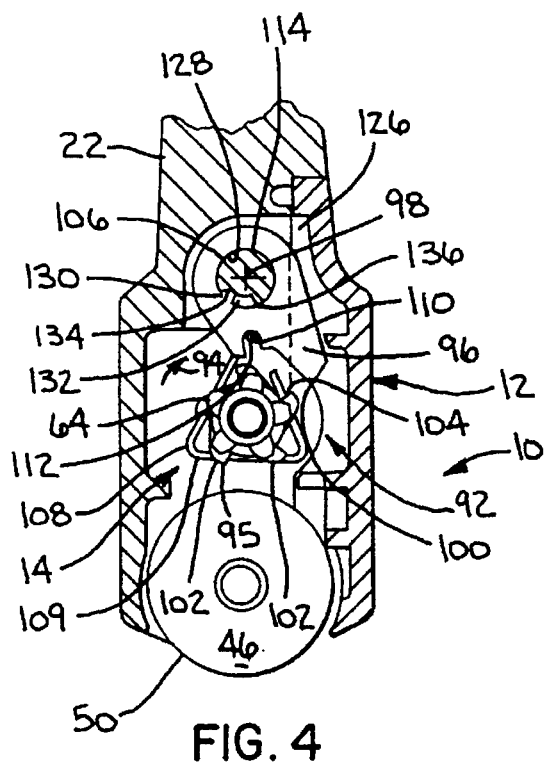
FIG. 4 is an enlarged cross-sectional view of the fishing reel taken along line 4—4 of FIG. 2.
Figure 5:
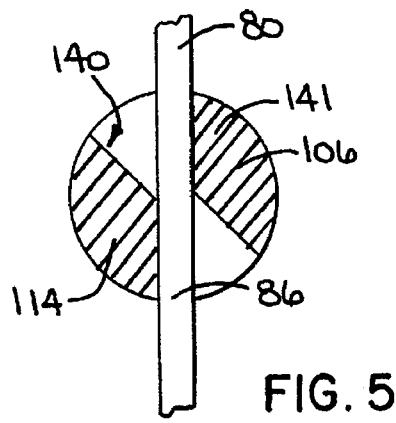
FIG. 5 is an enlarged cross-sectional view of an actuating switch for the anti-reverse system and a reel actuator/trigger taken along line 5—5 of FIG. 2.
Figure 6:
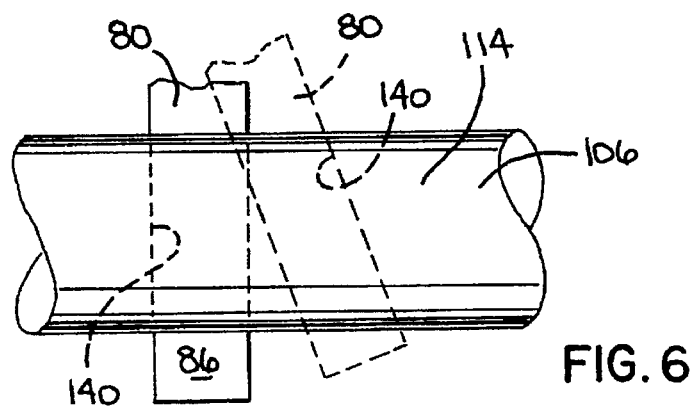
FIG. 6 is an enlarged, fragmentary, side elevation view of the actuating switch and actuator/trigger.

With the actuating switch 106 in the off position, shown in FIGS. 4 and 5, the pawl 96 is precluded from moving into its second, phantom line position. If one rotates the crank handle 58 in a backward direction, the shaft 56 rotates in the direction opposite to that shown by the arrow 94 in FIG. 4. The following leg 112 of the wire 108 urges the pawl 96 pivotably from the first, solid line position towards the second, phantom position. As this occurs, the tab 130 on the pawl 96 encounters the slot edge 134 on the actuating switch 106 which arrests further movement of the pawl 96. In this position, the pawl nose 100 remains clear of the ratchet wheels 95 so that the shaft 56 is free to rotate in the direction of the arrow 94.

Figure 3:
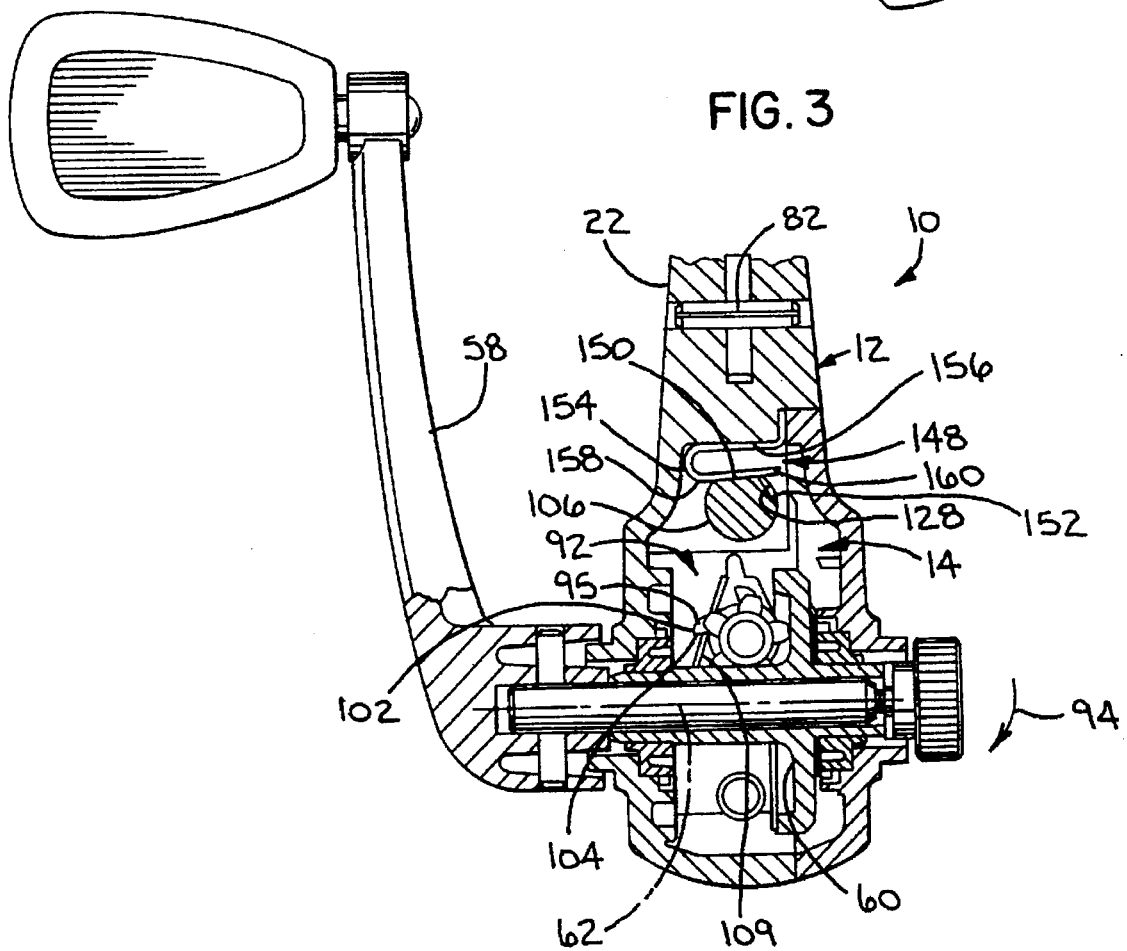
FIG. 3 is an enlarged cross-sectional view of the fishing reel taken along line 3—3 of FIG. 2.

By placing the actuating switch 106 in the on position, which is realized by rotating the actuating switch clockwise in FIGS. 4 and 5 through approximately 30° from the position of FIGS. 4 and 5, the pawl 96 is allowed to pivot fully between its first and second positions without interference between the tab 130 and the edges 134, 136. With the actuating switch 106 on, attempted reverse rotation of the shaft 56 causes the actuating wire 108 to follow this movement, whereupon the leg 112 on the actuating wire 108 causes the pawl 96 to assume its second, phantom line position, wherein the nose 100 moves between adjacent ratchet teeth 102 and thereby blocks further rotation of the shaft 56 as shown in FIG. 3.

While normally the described location of the actuating switch 106 would interfere with operation of the trigger 80, a slot 140 is provided through a thickened portion 141 of the body 114 to allow the trigger arm 86 to pass therethrough. The slot 140 is configured to closely match the fore and aft path of the leg 86 and to allow the actuating switch 106 to pivot between its on and off positions. The slot 140 has an X shape as viewed form the rear thereof to accommodate this movement of the actuating switch 106. This arrangement minimizes the amount of material removal, so as to maintain the integrity of the actuating switch 106, without interfering with movement of the trigger 80.

The actuating switch 106 can be simply assembled to the rear housing part 18 by a press fit step, after which the trigger 80 can be assembled. A set screw/pin 142 projects downwardly through the rear housing part 18 into a circumferential undercut 144, which blocks fore and aft movement of the actuating switch 106 with the actuating switch 106 in its operative position, yet permits pivoting of the actuating switch 106.

An enlarged head 146 is exposed externally of the reel at the rear portion thereof. The head 146 can be readily grasped and manipulated to place the actuating switch 106 in its on and off positions.

The invention also contemplates a detent-type structure at 148 to consistently maintain the actuating switch in each of its on and off positions. The periphery of the switch body 114 has spaced flats 150, 152. A U-shaped flat spring 154 is compressed between a wall 156 on the reel body 12 and the switch body 114. A flat surface 158 on one leg 160 of the compressed spring 154 facially abuts one flat 150, 152 in each of the on and off positions therefor to thereby resiliently hold the actuating switch 106 in each of the on and off positions.

With the above arrangement, the drag system at 34 can be conveniently located at the bottom of the reel, with the anti-reverse mechanism 92 above the shaft 56. Normally, with this type of configuration, the anti-reverse mechanism would not be placeable as shown in that it would interfere with the trigger 80. However, the inclusion of the slot 140 in the actuating switch 106 makes this location possible. Consequently, the anti-reverse mechanism 92 and drag system 34 do not compete for the same space, which obviates the need to enlarge the reel.

The foregoing disclosure of specific embodiments is intended to be illustrative of the broad concepts comprehended by the invention.

We claim:

1. A fishing reel comprising:

a reel body;

a shaft;

means for mounting the shaft to the red body for rotation about a first axis;

a line carrying spool;

means for mounting the line carrying spool to the reel body;

means for directing the line onto the spool as an incident of the shaft rotating in one rotational direction; and anti-reverse means placeable selectively in a) an engaged position for limiting rotation of the shaft in a direction opposite of the one direction and b) a disengaged position in which the shaft can rotate in the direction opposite to the one direction, said anti-reverse means including a pawl and means for mounting the pawl for movement relative to the reel body between first and second positions, said anti-reverse means including means cooperating between the pawl and shaft for limiting rotation of the shaft in the direction opposite to the one direction with the pawl in the first position and for allowing the shaft to rotate in the direction opposite to the one direction with the pawl in the second position, said anti-reverse means further including an actuating switch moveable between on and off positions corresponding respectively to the engaged and disengaged positions for the anti-reverse means, wherein the shaft, line carrying spool, means for mounting the line onto the spool and anti-reverse means comprise pans of an operating mechanism, said operating mechanism having a) a retrieve state and b) a casting state, there further being an actuator for changing the operating mechanism from its retrieve state into its casting state, said actuator being moveable relative to the body between first and second positions, there being means cooperating between the actuator and operating mechanism for changing the operating mechanism from its retrieve state into its casting state as an incident of the actuator moving from its first position into its second position, said actuating switch having a slot thereon to accept a portion of the actuator, wherein the actuator portion extends into the slot fully through the actuating switch.

2. A fishing reel comprising:

a reel body;

a shaft;

means for mounting the shaft to the reel body for rotation about a first axis;

line carrying spool;

means for mounting the line carrying spool to the reel body;

means for directing the line onto the spool as an incident of the shaft rotating in one rotational direction; and anti-reverse means placeable selectively in a) an engaged position for limiting rotation of the shaft in a direction opposite of the one direction and b) a disengaged position in which the shaft can rotate in the direction opposite to the one direction, said anti-reverse means including a pawl and means for mounting the pawl for movement relative to the reel body between first and second positions, said anti-reverse means including means cooperating between the pawl and shaft for limiting rotation of the shaft in the direction opposite to the one direction with the pawl in the first position and for allowing the shaft to rotate in the direction opposite to the one direction with the pawl in the second position.

said anti-reverse means further including an actuating switch moveable between on and off positions corresponding respectively to the engaged and disengaged positions for the anti-reverse means, wherein the shaft, line carrying spool, means for mounting the line onto the spool and anti-reverse means comprise parts of an operating mechanism, said operating mechanism having a) a retrieve state and b) a casting state, there further being an actuator for changing the operating mechanism from its retrieve state into its casting state, said actuator being moveable relative to the body between first and second positions, there being means cooperating between the actuator and operating mechanism for changing the operating mechanism from its retrieve state into its casting state as an incident of the actuator moving from its first position into its second position.

said actuating switch having a slot thereon to accept a portion of the actuator, wherein the slot is fully surrounded by the actuating switch, wherein the actuator portion extends into, through, and out of the slot.

* * * * *